United States Patent
Stelmar Netto et al.

(10) Patent No.: US 10,680,912 B1
(45) Date of Patent: Jun. 9, 2020

(54) INFRASTRUCTURE RESOURCE PROVISIONING USING TRACE-BASED WORKLOAD TEMPORAL ANALYSIS FOR HIGH PERFORMANCE COMPUTING

(71) Applicant: International Business Machines Corporation, Armonk, NY (US)

(72) Inventors: Marco Aurelio Stelmar Netto, São Paulo (BR); Renato Luiz De Freitas Cunha, São Paulo (BR); Bruno Silva, São Paulo (BR); Lucas Correia Villa Real, São Paulo (BR); Eduardo Rocha Rodrigues, São Paulo (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/243,111

(22) Filed: Jan. 9, 2019

(51) Int. Cl.
*G06F 15/173* (2006.01)
*H04L 12/24* (2006.01)
(Continued)

(52) U.S. Cl.
CPC ........ *H04L 41/5025* (2013.01); *G06F 9/4881* (2013.01); *G06F 9/5083* (2013.01);
(Continued)

(58) Field of Classification Search
CPC . H04L 41/5025; H04L 41/14; H04L 41/5051; H04L 67/1031; G06F 9/4881; G06F 9/5083
See application file for complete search history.

(56) References Cited

U.S. PATENT DOCUMENTS 8,104,038 B1 * 1/2012 Graupner ............... G06F 9/5044
718/104
8,555,287 B2 10/2013 Ding
(Continued)

OTHER PUBLICATIONS

Huang et al. "CAP3: A Cloud Auto-Provisioning Framework for Parallel Processing Using On-Demand and Spot Instances". 2013 IEEE Sixth International Conference on Cloud Computing. pp. 228-235.
(Continued)

*Primary Examiner* — Philip B Tran
(74) *Attorney, Agent, or Firm* — Edward P. Li

(57) ABSTRACT

A computer-implemented method, a computer program product, and a computer system for infrastructure resource provisioning using trace-based workload temporal analysis. An infrastructure provider receives, from an on-premises infrastructure, scheduler traces of the on-premises infrastructure, one or more scenarios, one or more goals, and one or more constraints of resource deployment on the on-premises infrastructure. The infrastructure provider performs trace-based workload temporal analysis, based on the scheduler traces, the one or more scenarios, the one or more goals, and the one or more constraints. The infrastructure provider generates one or more options of provisioning infrastructure resources, based on the trace-based workload temporal analysis. The infrastructure provider provisions the on-premises infrastructure with the infrastructure resources for running high performance computing (HPC) applications, based on a selection from the one or more options by an on-premises infrastructure administrator.

20 Claims, 6 Drawing Sheets

(51) Int. Cl.
G06F 9/48 (2006.01)
H04L 29/08 (2006.01)
G06F 9/50 (2006.01)

(52) U.S. Cl.
CPC .......... H04L 41/14 (2013.01); H04L 41/5051 (2013.01); H04L 67/1031 (2013.01)

(56) References Cited

U.S. PATENT DOCUMENTS

| | | | |
|---|---|---|---|
| 8,650,298 | B2 | 2/2014 | Daly |
| 8,719,627 | B2 | 5/2014 | Watson |
| 9,356,883 | B1 | 5/2016 | Borthakur |
| 9,363,190 | B2 | 6/2016 | Beloglazov |
| 9,405,572 | B2 | 8/2016 | Breitgand |
| 9,424,094 | B2 | 8/2016 | Cardosa |
| 9,560,166 | B2 | 1/2017 | Alam |
| 9,832,077 | B2 | 11/2017 | Ballew |
| 9,921,809 | B2 | 3/2018 | Dube |
| 2009/0113442 | A1* | 4/2009 | Deidda ................ G06F 9/5044 718/105 |
| 2011/0125894 | A1* | 5/2011 | Anderson ............. H04L 9/3213 709/224 |
| 2012/0072597 | A1 | 3/2012 | Teather |
| 2012/0179824 | A1* | 7/2012 | Jackson ................ G06F 9/5027 709/226 |
| 2013/0073724 | A1* | 3/2013 | Parashar ............... G06F 9/5038 709/224 |
| 2013/0185433 | A1* | 7/2013 | Zhu ....................... H04L 67/303 709/226 |
| 2013/0318525 | A1 | 11/2013 | Palanisamy |
| 2014/0257907 | A1* | 9/2014 | Chen ................ G06Q 10/06312 705/7.22 |
| 2014/0359132 | A1* | 12/2014 | Haskins ................ G06F 9/5011 709/226 |
| 2016/0283270 | A1* | 9/2016 | Amaral ................. G06F 9/5027 |
| 2018/0004868 | A1 | 1/2018 | Adam |
| 2018/0321979 | A1* | 11/2018 | Bahramshahry ........ G06F 9/505 |
| 2019/0116128 | A1* | 4/2019 | Guo .................... H04L 67/1021 |

OTHER PUBLICATIONS

Mell et al. "The NIST Definition of Cloud Computing" Recommendations of the National Institute of Standards and Technology. NIST Special Publication 800-145. Sep. 2011. Gaithersburg, MD. Seven pages.

Soni et al. "Time and Cost based Resource Provisioning Mechanism in Cloud Computing" International Journal of Advanced Research in Computer Science vol. 8, No. 5, May-Jun. 2017. Five pages.

Ullah et al. "Adaptive Resource Utilization Prediction System for Infrastructure as a Service Cloud". Computational Intelligence and Neuroscience vol. 2017, Article ID 4873459, Thirteen pages.

* cited by examiner

US 10,680,912 B1

INFRASTRUCTURE RESOURCE PROVISIONING USING TRACE-BASED WORKLOAD TEMPORAL ANALYSIS FOR HIGH PERFORMANCE COMPUTING

BACKGROUND

The present invention relates generally to infrastructure resource provisioning, and more particularly to infrastructure resource provisioning using trace-based workload temporal analysis for high performance computing.

High performance computing applications are being moved from traditional high performance computing centers to infrastructure (or cloud) providers. Typically, system administrators who want to setup an environment similar to their on-premises infrastructure counterpart have no tooling available that assist in this task. The system administrators need to pick resources at the Infrastructure as a Service (IaaS) layer and adjust such resources over time. If the resources picked is underutilized, this process may generate resource waste. If not enough resources are provisioned, this process may result in bad Quality of Service (QoS) for users.

SUMMARY

In one aspect, a computer-implemented method for infrastructure resource provisioning using trace-based workload temporal analysis is provided. The computer-implemented method is implemented by an infrastructure provider. The computer-implemented method includes: receiving from an on-premises infrastructure scheduler traces of the on-premises infrastructure; receiving from the on-premises infrastructure one or more scenarios, one or more goals, and one or more constraints of resource deployment on the on-premises infrastructure; performing trace-based workload temporal analysis, based on the scheduler traces, the one or more scenarios, the one or more goals, and the one or more constraints; generating one or more options of provisioning infrastructure resources, based on the trace-based workload temporal analysis; provisioning the on-premises infrastructure with the infrastructure resources for running high performance computing (HPC) applications, based on a selection from the one or more options, wherein the selection is made by an administrator of the on-premises infrastructure.

In another aspect, a computer program product for infrastructure resource provisioning using trace-based workload temporal analysis is provided. The computer program product comprising one or more computer-readable tangible storage devices and program instructions stored on at least one of the one or more computer-readable tangible storage devices. The program instructions are executable to receive from an on-premises infrastructure, by an infrastructure provider, scheduler traces of the on-premises infrastructure. The program instructions are further executable to receive from the on-premises infrastructure, by the infrastructure provider, one or more scenarios, one or more goals, and one or more constraints of resource deployment on the on-premises infrastructure. The program instructions are further executable to perform, by the infrastructure provider, trace-based workload temporal analysis, based on the scheduler traces, the one or more scenarios, the one or more goals, and the one or more constraints. The program instructions are further executable to generate, by the infrastructure provider, one or more options of provisioning infrastructure resources, based on the trace-based workload temporal analysis. The program instructions are further executable to provision, by the infrastructure provider, the on-premises infrastructure with the infrastructure resources for running high performance computing (HPC) applications, based on a selection from the one or more options, wherein the selection is made by an administrator of the on-premises infrastructure.

In yet another aspect, a computer system for infrastructure resource provisioning using trace-based workload temporal analysis is provided. The computer system comprises one or more processors, one or more computer readable tangible storage devices, and program instructions stored on at least one of the one or more computer readable tangible storage devices for execution by at least one of the one or more processors. The program instructions are executable to: receive from an on-premises infrastructure, by an infrastructure provider, scheduler traces of the on-premises infrastructure; receive from the on-premises infrastructure, by the infrastructure provider, one or more scenarios, one or more goals, and one or more constraints of resource deployment on the on-premises infrastructure; perform, by the infrastructure provider, trace-based workload temporal analysis, based on the scheduler traces, the one or more scenarios, the one or more goals, and the one or more constraints; generate, by the infrastructure provider, one or more options of provisioning infrastructure resources, based on the trace-based workload temporal analysis; provision, by the infrastructure provider, the on-premises infrastructure with the infrastructure resources for running high performance computing (HPC) applications, based on a selection from the one or more options, wherein the selection is made by an administrator of the on-premises infrastructure.

DETAILED DESCRIPTION

In embodiments of the present invention, a system of infrastructure resource provisioning uses traces from a job scheduler deployed in an existing on-premises infrastructure to properly provision infrastructure resources (or cloud resources) for high performance computing (HPC). In properly provisioning the infrastructure resources (or cloud resources), the system takes into account one or more scenarios (e.g., migration vs. cloud bursting vs. upgrade on-premises resources), one or more goals (e.g., throughput, utilization, and QoS of some users), and one or more constraints (e.g., budget). The system uses Monte Carlo simulations based on job scheduler simulations, a series of infrastructure resource provisioning options to meet a system administrator demand is generated. Thus, infrastructure resources (or cloud resources) for high performance computing (HPC) are provisioned, such that resource waste is avoided and users' QoS is met.

Figure 1:
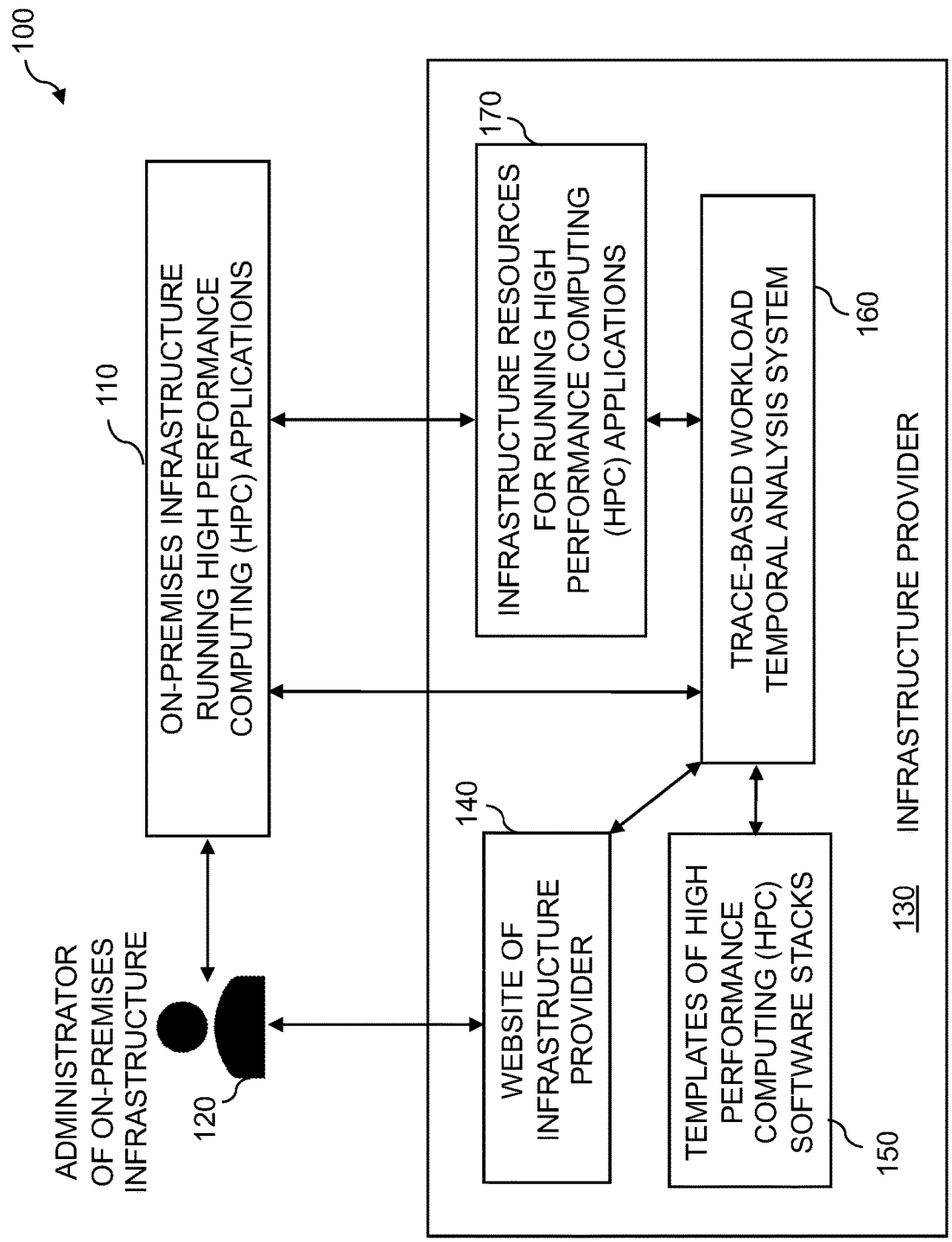
FIG. 1 is a systematic diagram illustrating a system of infrastructure resource provisioning using trace-based workload temporal analysis for high performance computing, in accordance with one embodiment of the present invention.

FIG. 1 is a systematic diagram illustrating system 100 of infrastructure resource provisioning using trace-based workload temporal analysis for high performance computing, in accordance with one embodiment of the present invention. System 100 of infrastructure resource provisioning comprises on-premises infrastructure 110. On-premises infrastructure 110 runs high performance computing (HPC) applications. In one embodiment, on-premises infrastructure 110 includes one or more physical machines. The one or more physical machines are described in more detail in later paragraphs with reference to FIG. 3. In another embodiment, on-premises infrastructure 110 includes one or more virtual machines or other virtualization implementations. The one or more virtual machines or the virtualization implementations run on one or more physical machines described in later paragraphs with reference to FIG. 3.

System 100 of infrastructure resource provisioning further comprises infrastructure provider (or cloud provider) 130. Infrastructure provider (or cloud provider) 130 comprises infrastructure resources 170 for running high performance computing (HPC) applications. Infrastructure provider (or cloud provider) 130 provisions on-premises infrastructure 110 with the infrastructure resources. Infrastructure provider (or cloud provider) 130 further comprises trace-based workload temporal analysis system 160, templates 150 of high performance computing (HPC) software stacks, and website 140 of infrastructure provider (or cloud provider) 130. In one embodiment, infrastructure provider (or cloud provider) 130 is hosted on one or more physical machines. The one or more physical machines are described in more detail in later paragraphs with reference to FIG. 3. In another embodiment, infrastructure provider (or cloud provider) 130 is hosted on one or more virtual machines or other virtualization implementations. The one or more virtual machines or the virtualization implementations run on one or more physical machines described in later paragraphs with reference to FIG. 3.

Administrator 120 of on-premises infrastructure 110 accesses website 140 of infrastructure provider (or cloud provider) 130 to submit scheduler traces of on-premises infrastructure 110 and provide information on one or more scenarios, one or more goals, and one or more constraints of resource deployment on on-premises infrastructure 110. For example, the one or more scenarios include migration of local computing environment, cloud bursting, and upgrade on-premises resources; the one or more goals include network throughput, resource utilization, and QoS (Quality of Service); the one or more restraints include budget. To perform trace-based workload temporal analysis and generate options of provisioning the infrastructure resources, trace-based workload temporal analysis system 160 uses the scheduler traces and the information on the one or more scenarios, the one or more goals, and the one or more constraints.

Trace-based workload temporal analysis system 160 retrieves information from a database. i.e., templates 150 of high performance computing (HPC) software stacks, to identify scheduler middleware and a current software stack of on-premises infrastructure 110, based on the scheduler traces submitted by administrator 120.

Trace-based workload temporal analysis system 160 obtains one or more configurations of a computing environment of on-premises infrastructure 110, by running a scan in machines of on-premises infrastructure 110, obtaining information from scheduler configuration files of on-premises infrastructure 110, or receiving an input from administrator 120.

Trace-based workload temporal analysis system 160 calculates performance of the computing environment on on-premises infrastructure 110 and also calculates performance that infrastructure resources 170 can offer. Trace-based workload temporal analysis system 160 compares results of the calculations. In the calculations, parameters or metrics of the performance, for example, the number of float point operations per second (FLOPS) and/or the execution time of the high performance computing (HPC) applications, are calculated. The performance of the computing environment on on-premises infrastructure 110 and the performance of infrastructure resources 170 of infrastructure provider (or cloud provider) 130 are compared.

Trace-based workload temporal analysis system 160 performs trace-based workload temporal analysis. Based on results of the trace-based workload temporal analysis, trace-based workload temporal analysis system 160 generates options of provisioning the infrastructure resources. Performing trace-based workload temporal analysis and generating options of provisioning the infrastructure resources will be discussed in detail in later paragraphs of this document.

Trace-based workload temporal analysis system 160 presents the options of provisioning the infrastructure resources to administrator 120 of on-premises infrastructure 110. Through website 140 of infrastructure provider (or cloud provider) 130, administrator 120 reviews the options and makes a selections from the options of provisioning the infrastructure resources. Based on the selection made by administrator 120, infrastructure provider (or cloud provider) 130 provisions on-premises infrastructure 110 with the infrastructure resources for running high performance computing (HPC) applications.

Figure 2A:
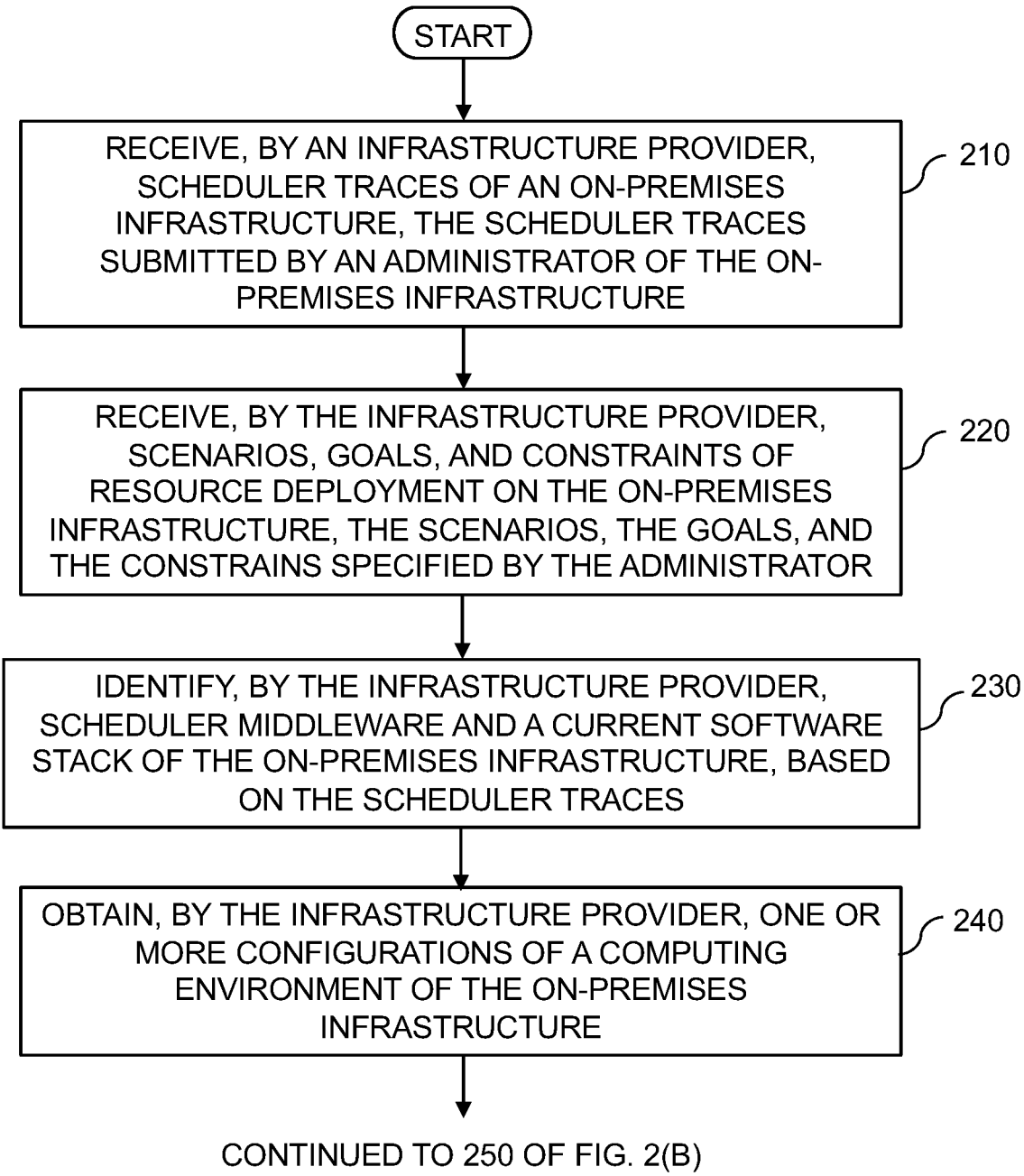
FIG. 2(A) and FIG. 2(B) present a flowchart showing operational steps of trace-based workload temporal analysis, in accordance with one embodiment of the present invention.
Figure 2B:
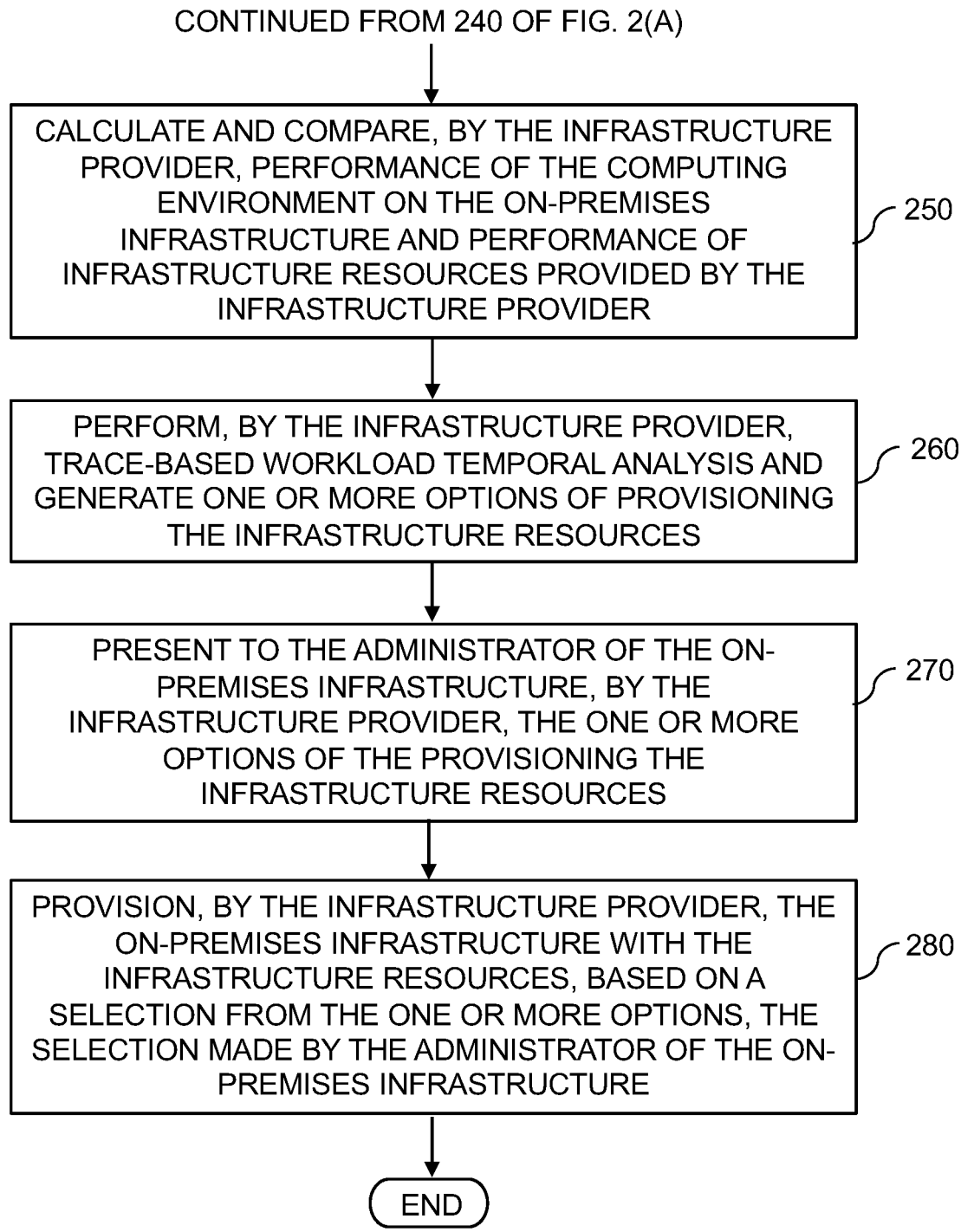

FIG. 2(A) and FIG. 2(B) present a flowchart showing operational steps of trace-based workload temporal analysis, in accordance with one embodiment of the present invention. At step 210, an infrastructure provider (or cloud provider) receives scheduler traces of an on-premises infrastructure. The scheduler traces of the on-premises infrastructure is submitted or provided by an administrator of the on-premises infrastructure. In an embodiment shown in FIG. 1, infrastructure provider (or cloud provider) 130, at step 210, receives scheduler traces of on-premises infrastructure 110; the scheduler traces is submitted or provided by administrator 120 through website 140 of infrastructure provider (or cloud provider) 130.

At step 220, the infrastructure provider (or cloud provider) receives one or more scenarios, one or more goals, and one or more constraints of resource deployment on the on-premises infrastructure. The one or more scenarios, the one or more goals, and the one or more constraints are received from the administrator. The one or more scenarios, the one or more goals, and the one or more constraints are specified by the administrator of the on-premises infrastructure. For example, the administrator may specify the following one or more scenarios of the resource deployment: migration of local computing environment, cloud bursting, and upgrade on-premises resources; the administrator may specify the following one or more goals of the resource deployment: one or more of network throughput, resource utilization, and QoS (Quality of Service); the administrator may specify budget as a constraint. In an embodiment shown in FIG. 1, infrastructure provider (or cloud provider) 130, at step 220, receives from administrator 120 the one or more scenarios, the one or more goals, and the one or more constraints; administrator 120 accesses website 140 of infrastructure provider (or cloud provider) 130 to specify the one or more scenarios, the one or more goals, and the one or more constraints.

At step 230, the infrastructure provider (or cloud provider) identifies scheduler middleware and a current software stack of the on-premises infrastructure, based on the scheduler traces received at step 210. To identify the scheduler middleware and the current software stack of the on-premises infrastructure, the infrastructure provider (or cloud provider) retrieves information from a database. The database includes, for example, templates of high performance computing (HPC) software stacks and information of scheduler middleware. In an embodiment shown in FIG. 1, infrastructure provider (or cloud provider) 130, at step 230, identifies the scheduler middleware and the current software stack of on-premises infrastructure 110; infrastructure provider (or cloud provider) 130 retrieves information from the database, i.e., templates 150 of high performance computing (HPC) software stacks.

At step 240, the infrastructure provider (or cloud provider) obtains one or more configurations of a computing environment of the on-premises infrastructure. In one embodiment, the infrastructure provider (or cloud provider) obtains the one or more configurations by running a scan in machines of the on-premises infrastructure. In another embodiment, the infrastructure provider (or cloud provider) obtains the one or more configurations by obtaining information from scheduler configuration files of the on-premises infrastructure. In yet another embodiment, the infrastructure provider (or cloud provider) obtains the one or more configurations by receiving an input from the administrator of the on-premises infrastructure. In an embodiment shown in FIG. 1, infrastructure provider (or cloud provider) 130, at step 240, obtains the one or more configurations of the computing environment of on-premises infrastructure 110; for example, trace-based workload temporal analysis system 160 on infrastructure provider (or cloud provider) 130 obtains the one or more configurations. In the embodiment shown in FIG. 1, the one or more configurations may be obtained by infrastructure provider (or cloud provider) 130 using at least one of the following ways: running a scan in machines of on-premises infrastructure 110, obtaining information from scheduler configuration files of on-premises infrastructure 110, and receiving an input from administrator 120 of on-premises infrastructure 110. In the embodiment shown in FIG. 1, administrator 120 inputs the one or more configurations through website 140 of infrastructure provider (or cloud provider) 130.

At step 250, the infrastructure provider (or cloud provider) calculates performance of the computing environment on the on-premises infrastructure and performance of infrastructure resources provided by the infrastructure provider. At the step, the infrastructure provider compares the results of these calculations. At the step, the infrastructure provider (or cloud provider) calculates parameters or metrics of the performance, for example, the number of float point operations per second (FLOPS) and/or the execution time of the high performance computing (HPC) applications. In an embodiment shown in FIG. 1, at step 250, infrastructure provider (or cloud provider) 130 calculates and compares the performance of the computing environment on the on-premises infrastructure and the performance of infrastructure resources provided by the infrastructure provider. For example, trace-based workload temporal analysis system 160 on infrastructure provider (or cloud provider) 130 makes the calculation and the comparison.

At step 260, the infrastructure provider (or cloud provider) performs trace-based workload temporal analysis. The infrastructure provider (or cloud provider) further generates one or more options of provisioning the infrastructure resources for running high performance computing (HPC) applications, based on the analysis. More particularly, a trace-based workload temporal analysis system on the the infrastructure provider (or cloud provider) performs the trace-based workload temporal analysis and generates the one or more options of provisioning the infrastructure resources based on the analysis. In an embodiment shown in FIG. 1, at step 260, trace-based workload temporal analysis system 160 on infrastructure provider (or cloud provider) 130 performs the analysis and generates the one or more options.

At step 260, the trace-based workload temporal analysis and the generation of the one or more options of provisioning the infrastructure resources are based on the scheduler traces, the one or more scenarios, the one or more goals, and the one or more constraints. The scheduler traces are submitted or provided by the administrator of the on-premises infrastructure and received by the the infrastructure provider (or cloud provider) at step 210. The one or more scenarios, the one or more goals, and the one or more constraints are specified by the administrator of the on-premises infrastructure and received by the infrastructure provider (or cloud provider) at step 220. The generated one or more options satisfy the one or more scenarios, the one or more goals, and the one or more constraints.

Details of step 260 are described as follows. (1) The trace-based workload temporal analysis system on the the infrastructure provider (or cloud provider) employs time series analysis approaches (for example, moving average models) to estimate changes in workload trends (for example increasing request rate) and update the one or more goals of resource deployment. (2) The trace-based workload temporal analysis system runs a scheduler simulator using the scheduler traces as an input of simulations and evaluates multiple options of provisioning the infrastructure resources. The evaluation of the multiple options is performed by using a Monte Carlo method. (3) The scheduler simulator simulates n computing resources and types, for example, in a case that the cloud provider infrastructure is a scenario and budget is a constraint. (4) The scheduling algorithm of the scheduler simulator is FIFO (First-In, First-Out) with EASY-backfilling (which is a traditional HPC scheduling algorithm). (5) For each simulation, the scheduler simulator collects metrics of interest (for example, throughput, utilization, QoS) and then adds or removes infrastructure resources using a bisection algorithm for instance. The number of infrastructure resources to be added or removed depends on the available infrastructure resources for the evaluation. For a scenario with cloud bursting, single-core jobs can be separated as they are good candidates to be executed in the cloud computing environment. (6) If the administrator is interested in providing different QoS for different user types or job characteristics, the options can be generated with different queues and partitions for the scheduler, by incrementing or reducing the size of the partition, the number of the infrastructure resources, and the properties of jobs (memory allocated, CPU, job length, etc.). Over time, the infrastructure provider (or cloud provider) will have enough data and generated options that can leverage the best option.

At step 270, the infrastructure provider (or cloud provider) presents the one or more options of the provisioning the infrastructure resources (which are generated at step 260) to the administrator of the on-premises infrastructure. In an embodiment shown in FIG. 1, at step 270, infrastructure provider (or cloud provider) 130 presents the one or more options to administrator 120, administrator 120 reviews the one or more options on website 140 of infrastructure provider (or cloud provider) 130, and then administrator 120 makes a selection from the one or more options of the provisioning the infrastructure resources.

At step 280, the infrastructure provider (or cloud provider) provisions the on-premises infrastructure with the infrastructure resources, based on the selection made by the administrator of the on-premises infrastructure. In an embodiment shown in FIG. 1, at step 280, infrastructure provider (or cloud provider) 130 provisions on-premises infrastructure 110 with the infrastructure resources for running high performance computing (HPC) applications, based on the selection made by administrator 120 of on-premises infrastructure 110.

Figure 3:
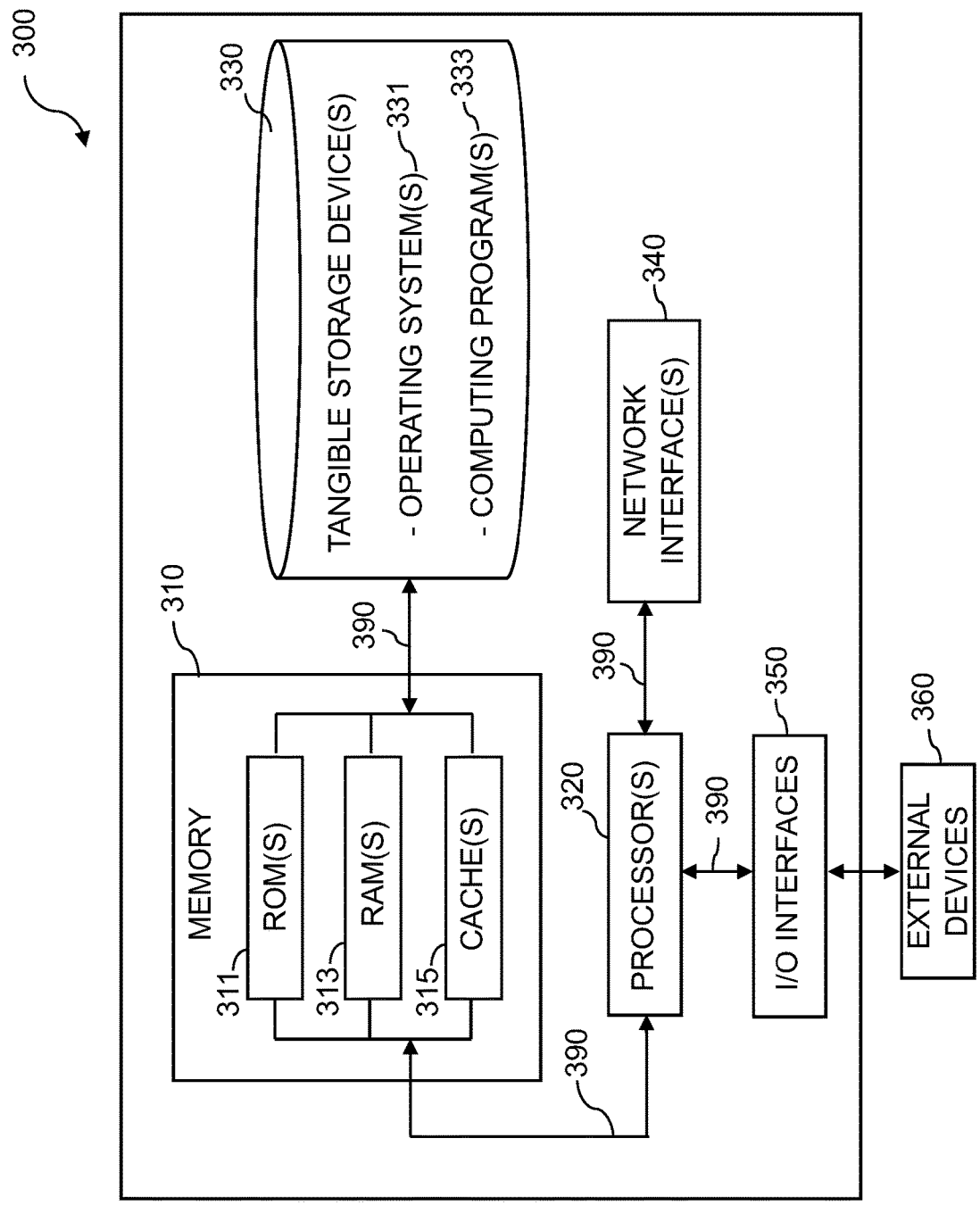
FIG. 3 is a diagram illustrating components of a computing device, in accordance with one embodiment of the present invention.

FIG. 3 is a diagram illustrating components of computing device 300 hosting on-premises infrastructure 110 or infrastructure provider (or cloud provider) 130 shown in FIG. 1, in accordance with one embodiment of the present invention. It should be appreciated that FIG. 3 provides only an illustration of one implementation and does not imply any limitations with regard to the environment in which different embodiments may be implemented.

Referring to FIG. 3, computing device 300 includes processor(s) 320, memory 310, and tangible storage device(s) 330. In FIG. 3, communications among the above-mentioned components of computing device 300 are denoted by numeral 390. Memory 310 includes ROM(s) (Read Only Memory) 311, RAM(s) (Random Access Memory) 313, and cache(s) 315. One or more operating systems 331 and one or more computer programs 333 reside on one or more computer readable tangible storage device(s) 330.

Computing device 300 further includes I/O interface(s) 350. I/O interface(s) 350 allows for input and output of data with external device(s) 360 that may be connected to computing device 300. Computing device 300 further includes network interface(s) 340 for communications between computing device 300 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the C programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
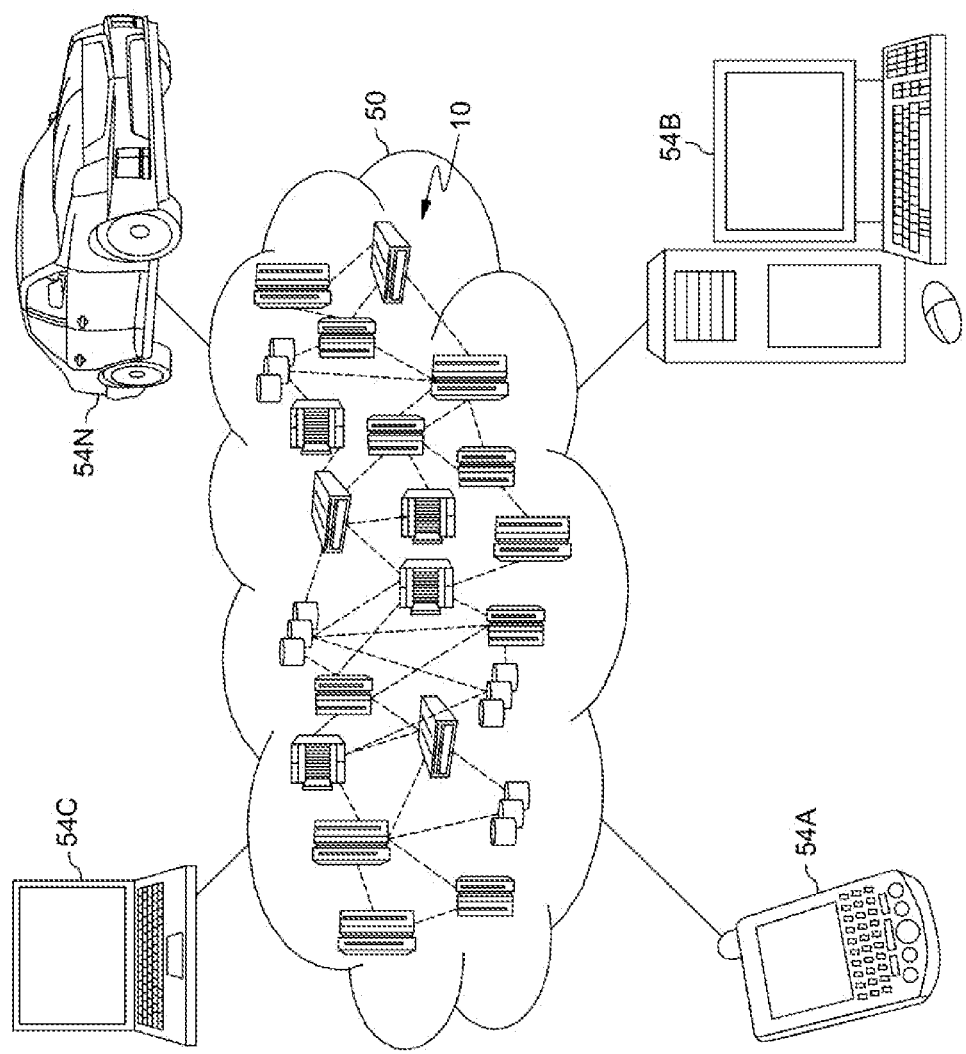
FIG. 4 depicts a cloud computing environment, in accordance with one embodiment of the present invention.

Referring now to FIG. 4, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 5:
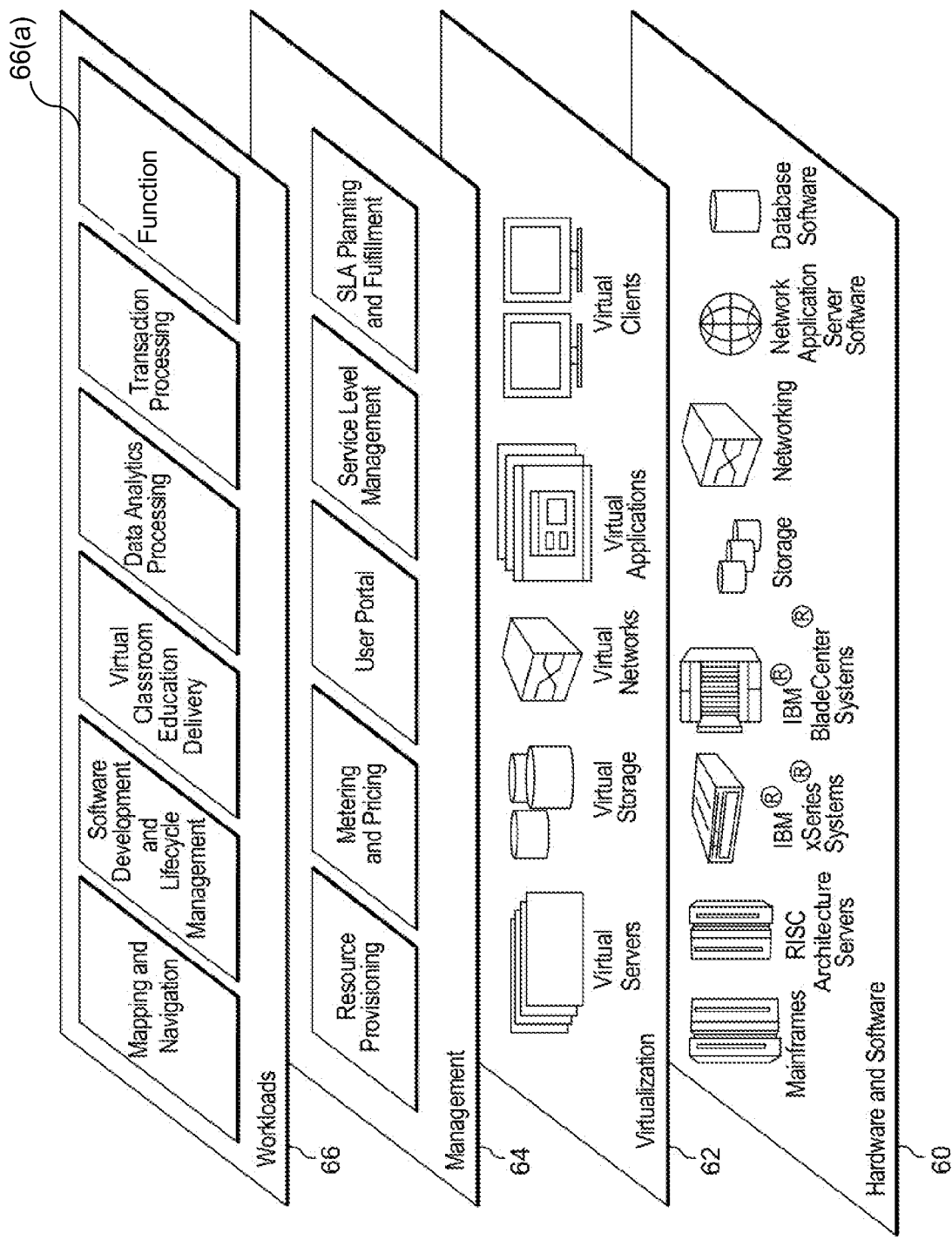
FIG. 5 depicts abstraction model layers in a cloud computing environment, in accordance with one embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes, RISC (Reduced Instruction Set Computer) architecture based servers, servers, blade servers, storage devices, and networks and networking components. In some embodiments, software components include network application server software and database software.

Virtualization layer 62 provides an abstraction layer from which the following examples of virtual entities may be provided: virtual servers, virtual storage, virtual networks, including virtual private networks, virtual applications and operating systems, and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User Portal provides access to the cloud computing environment for consumers and system administrators. Service Level Management provides cloud computing resource allocation and management such that required service levels are met. Service Level Agreement (SLA) Planning and Fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: Mapping and Navigation, Software Development and Lifecycle Management, Virtual Classroom Education Delivery, Data Analytics Processing, Transaction Processing, and functionality according to the present invention (Function 66a). Function 66a in the present invention is the functionality of trace-based workload temporal analysis system 160 on infrastructure provider (or cloud provider) 130 (shown in FIG. 1) in a cloud computing environment.

What is claimed is:

1. A computer-implemented method for infrastructure resource provisioning using trace-based workload temporal analysis, the method comprising:
   receiving from an on-premises infrastructure, by an infrastructure provider, scheduler traces of the on-premises infrastructure;
   receiving from the on-premises infrastructure, by the infrastructure provider, one or more scenarios, one or more goals, and one or more constraints of resource deployment on the on-premises infrastructure;
   performing, by the infrastructure provider, trace-based workload temporal analysis, based on the scheduler traces, the one or more scenarios, the one or more goals, and the one or more constraints;
   generating, by the infrastructure provider, one or more options of provisioning infrastructure resources, based on the trace-based workload temporal analysis; and
   provisioning, by the infrastructure provider, the on-premises infrastructure with the infrastructure resources for running high performance computing (HPC) applications, based on a selection from the one or more options, wherein the selection is made by an administrator of the on-premises infrastructure.

2. The computer-implemented method of claim 1, further comprising:
   identifying, by the infrastructure provider, scheduler middleware and a current software stack of the on-premises infrastructure, based on the scheduler traces, by using a database including templates of high performance computing (HPC) software stacks and information of scheduler middleware; and
   obtaining, by the infrastructure provider, one or more configurations of a computing environment of the on-premises infrastructure, by at least one of running a scan in machines of the on-premises infrastructure, obtaining information from scheduler configuration files of the on-premises infrastructure, and receiving an input from the administrator of the on-premises infrastructure.

3. The computer-implemented method of claim 1, further comprising:
   calculating and comparing, by the infrastructure provider, performance of a computing environment on the on-premises infrastructure and performance of the infrastructure resources provided by the infrastructure provider.

4. The computer-implemented method of claim 1, further comprising:
   presenting to the administrator of the on-premises infrastructure, by the infrastructure provider, the one or more options of provisioning the infrastructure resources; and
   receiving from the administrator, by the infrastructure provider, the selection from the one or more options of provisioning the infrastructure resources.

5. The computer-implemented method of claim 1, wherein the administrator of the on-premises infrastructure submits the scheduler traces of the on-premises infrastructure, through a website of the infrastructure provider; wherein the administrator of the on-premises infrastructure specifies the one or more scenarios, the one or more goals, and the one or more constraints of resource deployment on the on-premises infrastructure.

6. The computer-implemented method of claim 1, wherein the performing the trace-based workload temporal analysis comprises:
    employing, by a trace-based workload temporal analysis system on the infrastructure provider, time series analysis approaches to estimate changes in workload trends and update the one or more goals of resource deployment.

7. The computer-implemented method of claim 1, wherein the performing the trace-based workload temporal analysis comprises:
    running, by a trace-based workload temporal analysis system on the infrastructure provider, a scheduler simulator using the scheduler traces as an input of simulations; and
    evaluating, by the trace-based workload temporal analysis system on the infrastructure provider, the one or more options of provisioning the infrastructure resources, using a Monte Carlo method.

8. A computer program product for infrastructure resource provisioning using trace-based workload temporal analysis, the computer program product comprising one or more computer-readable tangible storage devices and program instructions stored on at least one of the one or more computer-readable tangible storage devices, the program instructions executable to:
    receive from an on-premises infrastructure, by an infrastructure provider, scheduler traces of the on-premises infrastructure;
    receive from the on-premises infrastructure, by the infrastructure provider, one or more scenarios, one or more goals, and one or more constraints of resource deployment on the on-premises infrastructure;
    perform, by the infrastructure provider, trace-based workload temporal analysis, based on the scheduler traces, the one or more scenarios, the one or more goals, and the one or more constraints;
    generate, by the infrastructure provider, one or more options of provisioning infrastructure resources, based on the trace-based workload temporal analysis; and
    provision, by the infrastructure provider, the on-premises infrastructure with the infrastructure resources for running high performance computing (HPC) applications, based on a selection from the one or more options, wherein the selection is made by an administrator of the on-premises infrastructure.

9. The computer program product of claim 8, further comprising the program instructions executable to:
    identify, by the infrastructure provider, scheduler middleware and a current software stack of the on-premises infrastructure, based on the scheduler traces, by using a database including templates of high performance computing (HPC) software stacks and information of scheduler middleware; and
    obtain, by the infrastructure provider, one or more configurations of a computing environment of the on-premises infrastructure, by at least one of running a scan in machines of the on-premises infrastructure, obtaining information from scheduler configuration files of the on-premises infrastructure, and receiving an input from the administrator of the on-premises infrastructure.

10. The computer program product of claim 8, further comprising the program instructions executable to:
    calculate and compare, by the infrastructure provider, performance of a computing environment on the on-premises infrastructure and performance of the infrastructure resources provided by the infrastructure provider.

11. The computer program product of claim 8, further comprising the program instructions executable to:
    present to the administrator of the on-premises infrastructure, by the infrastructure provider, the one or more options of provisioning the infrastructure resources; and
    receive from the administrator, by the infrastructure provider, the selection from the one or more options of provisioning the infrastructure resources.

12. The computer program product of claim 8, wherein the administrator of the on-premises infrastructure submits the scheduler traces of the on-premises infrastructure, through a website of the infrastructure provider; wherein the administrator of the on-premises infrastructure specifies the one or more scenarios, the one or more goals, and the one or more constraints of resource deployment on the on-premises infrastructure.

13. The computer program product of claim 8, further comprising program instructions executable to:
    employ, by a trace-based workload temporal analysis system on the infrastructure provider, time series analysis approaches to estimate changes in workload trends and update the one or more goals of resource deployment.

14. The computer program product of claim 8, further comprising the program instructions executable to:
    run, by a trace-based workload temporal analysis system on the infrastructure provider, a scheduler simulator using the scheduler traces as an input of simulations; and
    evaluate, by the trace-based workload temporal analysis system on the infrastructure provider, the one or more options of provisioning the infrastructure resources, using a Monte Carlo method.

15. A computer system for infrastructure resource provisioning using trace-based workload temporal analysis, the computer system comprising:
    one or more processors, one or more computer readable tangible storage devices, and program instructions stored on at least one of the one or more computer readable tangible storage devices for execution by at least one of the one or more processors, the program instructions executable to:
    receive from an on-premises infrastructure, by an infrastructure provider, scheduler traces of the on-premises infrastructure;
    receive from the on-premises infrastructure, by the infrastructure provider, one or more scenarios, one or more goals, and one or more constraints of resource deployment on the on-premises infrastructure;
    perform, by the infrastructure provider, trace-based workload temporal analysis, based on the scheduler traces, the one or more scenarios, the one or more goals, and the one or more constraints;
    generate, by the infrastructure provider, one or more options of provisioning infrastructure resources, based on the trace-based workload temporal analysis; and
    provision, by the infrastructure provider, the on-premises infrastructure with the infrastructure resources for running high performance computing (HPC) applications, based on a selection from the one or more options, where the selection is made by an administrator of the on-premises infrastructure.

16. The computer system of claim 15, further comprising the program instructions executable to:
identify, by the infrastructure provider, scheduler middleware and a current software stack of the on-premises infrastructure, based on the scheduler traces, by using a database including templates of high performance computing (HPC) software stacks and information of scheduler middleware; and
obtain, by the infrastructure provider, one or more configurations of a computing environment of the on-premises infrastructure, by at least one of running a scan in machines of the on-premises infrastructure, obtaining information from scheduler configuration files of the on-premises infrastructure, and receiving an input from the administrator of the on-premises infrastructure.

17. The computer system of claim 15, further comprising the program instructions executable to:
calculate and compare, by the infrastructure provider, performance of a computing environment on the on-premises infrastructure and performance of the infrastructure resources provided by the infrastructure provider.

18. The computer system of claim 15, further comprising the program instructions executable to:
present to the administrator of the on-premises infrastructure, by the infrastructure provider, the one or more options of provisioning the infrastructure resources; and
receive from the administrator, by the infrastructure provider, the selection from the one or more options of provisioning the infrastructure resources.

19. The computer system of claim 15, wherein the administrator of the on-premises infrastructure submits the scheduler traces of the on-premises infrastructure, through a website of the infrastructure provider; wherein the administrator of the on-premises infrastructure specifies the one or more scenarios, the one or more goals, and the one or more constraints of resource deployment on the on-premises infrastructure.

20. The computer system of claim 15, further comprising program instructions executable to:
employ, by a trace-based workload temporal analysis system on the infrastructure provider, time series analysis approaches to estimate changes in workload trends and update the one or more goals of resource deployment;
run, by the trace-based workload temporal analysis system on the infrastructure provider, a scheduler simulator using the scheduler traces as an input of simulations; and
evaluate, by the trace-based workload temporal analysis system on the infrastructure provider, the one or more options of provisioning the infrastructure resources, using a Monte Carlo method.

* * * * *